US006019135A

United States Patent [19]

Onishi

[11] Patent Number: 6,019,135

[45] Date of Patent: Feb. 1, 2000

[54] DIAPHRAGM STOPPER CONSTRUCTION FOR A HIGH-PRESSURE ACCUMULATOR

[75] Inventor: Yoshihiko Onishi, Tokyo, Japan

[73] Assignee: Mitsubishi Denki Kabushiki Kaisha, Tokyo, Japan

[21] Appl. No.: 09/184,015

[22] Filed: Nov. 2, 1998

[30] Foreign Application Priority Data

Mar. 31, 1998 [JP] Japan .................................. 10-087051

[51] Int. Cl.[7] ...................................................... F16L 55/04

[52] U.S. Cl. ................................ 138/30; 138/26; 220/721

[58] Field of Search .................................. 138/30, 31, 26; 220/721–724

[56] References Cited

U.S. PATENT DOCUMENTS 3,474,830 10/1969 Hertell ...................................... 138/30
3,593,747 7/1971 Mercier ..................................... 138/30
4,129,025 12/1978 Carey et al. .......................... 138/30 X
4,629,532 12/1986 Kercher ................................ 138/30 X

FOREIGN PATENT DOCUMENTS 2-225801 9/1990 Japan .

*Primary Examiner*—Patrick Brinson
*Attorney, Agent, or Firm*—Sughrue, Mion, Zinn, Macpeak & Seas, PLLC

[57] ABSTRACT

A diaphragm stopper construction for a high-pressure accumulator is provided which prevents excessive concentrations of stress in a diaphragm.

The curve of the contact surface of a stopper includes a first curve for the perimeter portion of a diaphragm 86 which is determined on the basis of a first equation expressing deflection when a disk secured around its circumference is subjected to a uniformly distributed load; and a second curve for the central portion which is determined on the basis of a second equation expressing large deflection when a disk secured around its circumference is subjected to a uniformly distributed load.

4 Claims, 5 Drawing Sheets

DIAPHRAGM STOPPER CONSTRUCTION FOR A HIGH-PRESSURE ACCUMULATOR

BACKGROUND OF THE INVENTION

1. Field of the Invention

The present invention relates to a diaphragm stopper construction for a high-pressure accumulator which defines the limit of deformation of a flexible disk-shaped metal diaphragm disposed in a high-pressure vessel which supports and seals the perimeter portion of the diaphragm to form a high-pressure chamber.

2. Description of the Related Art

Diesel engines are the most widely known of the so-called "cylinder-injected" or "direct injection engines", engines in which fuel is injected into the engine cylinder, but in recent years cylinder-injected spark ignition engines (gasoline engines) have also been proposed. Cylinder-injected engines of this kind demand that fuel pressure surges be minimized to maintain sufficiently high fuel injection pressure and ensure stable injection. To this end, compact single-cylinder high-pressure fuel pumps have been proposed which are of simple construction and inexpensive to manufacture.

However, because there is only one plunger in the single-cylinder system, there are surges of quite some amplitude in the pressure of the fuel discharged, and so surge absorption devices with metal bellows or diaphragms have been proposed to absorb these surges.

FIG. 4 shows a high-pressure fuel supply system provided with a high-pressure accumulator which is a useful example of a surge absorption device to which the diaphragm stopper construction of the present invention can be applied. In FIG. 4, a delivery pipe 1, which is a fuel injection apparatus, is provided with a plurality of injectors 1*a* corresponding to the number of engine cylinders, which are not shown. A high-pressure fuel pump assembly 200 provided with a high-pressure fuel pump 3 is disposed between the delivery pipe 1 and a fuel tank 2. The delivery pipe 1 and the high-pressure fuel pump 3 are connected by a high-pressure fuel passage 4 and the high-pressure fuel pump 3 and the fuel tank 2 are connected by a low-pressure fuel passage 5. Together, the high-pressure fuel passage 4 and the low-pressure fuel passage 5 compose a fuel passage connecting the delivery pipe 1 to the fuel tank 2. A filter 6 is disposed in the fuel intake of the high-pressure fuel pump 3. A check valve 7 is disposed on the fuel discharge side of the high-pressure fuel pump 3. A drain 8 attached to the high-pressure fuel pump 3 returns to the fuel tank 2.

A low-pressure fuel pump 10 is disposed at the end of the low-pressure fuel passage 5 closest to the fuel tank 2. A filter 11 is disposed in the fuel intake of the low-pressure fuel pump 10. A check valve 12 is disposed in the low-pressure fuel passage 5 on the fuel discharge side of the low-pressure fuel pump 10. A low-pressure regulator 14 is disposed in the low-pressure fuel passage 5 between the high-pressure fuel pump 3 and the low-pressure fuel pump 10. A filter 15 is disposed in the fuel intake of the low-pressure regulator 14. A drain 16 attached to the low-pressure regulator 14 returns to the fuel tank 2.

The high-pressure fuel pump 3 increases the pressure of the fuel supplied to it by the low-pressure fuel passage 5 and discharges it to the delivery pipe 1. A dumper 30 is disposed on the low-pressure fuel passage 5 side of the high-pressure fuel pump 3, i.e., the low-pressure side. A high-pressure accumulator 70 and a high-pressure regulator 32 are disposed on the high-pressure side of the high-pressure fuel pump 3. A drain 33 attached to the high-pressure regulator 32 returns to the fuel input side of the high-pressure fuel pump 3.

FIG. 5 is a cross-section showing details of the high-pressure fuel pump assembly 200 when fully assembled, comprising the high-pressure fuel pump 3, dumper 30, high-pressure accumulator 70, high-pressure regulator 32, filter 6, and check valve 7. In FIG. 5, a recess portion 40*c* is formed in the casing 40 on the right-hand side of the diagram, and the high-pressure accumulator 70 is secured to the recess portion 40*c*. A discharge passage 4*b* which communicates with a discharge passage 4*a* is formed as a recess in the bottom of the recess portion 40*c*.

FIG. 6 is a cross-section showing details of the high-pressure accumulator 70, which is a surge absorption device to which the diaphragm stopper construction of the present invention can be applied. The high-pressure accumulator 70 is provided with a case 85, which is a high-pressure vessel roughly the shape of a thick disk, a flexible disk-shaped metal diaphragm 86, supported by and sealed against the case 85 around its perimeter portion so that together they form a high-pressure chamber 71, and a disk-shaped plate 89, which is a stopper defining the limit of deformation of the diaphragm 86.

The case 85 has a comparatively thin perimeter portion 72, which supports and seals the outer perimeter portion of the diaphragm 86 by a sealing weld, and a comparatively thick central portion 73, in which the high-pressure chamber 71 is formed. A male thread 91 is formed on the cylindrical outer surface of the perimeter portion 72, and a comparatively shallow saucer-shaped recess portion 74, which gradually deepens from the perimeter portion towards the central portion in a smooth curve to allow the diaphragm 86 to deform towards the high-pressure chamber 71, is formed in the portion in close contact with the diaphragm 86. An approximately-cylindrical recess portion 75, which communicates with the shallow saucer-shaped recess portion 74 at the central portion, is formed in the central portion 73 and, together with the saucer-shaped recess portion 74, forms the high-pressure chamber 71.

A gas charge inlet 84 of circular cross-section about its central axis is formed in the ceiling portion of the high-pressure chamber 71 to introduce high-pressure gas to the high-pressure chamber 71 of the case 85 and seal it in, and a sealing device 87 is disposed therein to seal the gas charge inlet 84. The gas charge inlet 84 is provided with a small-diameter portion 76 of comparatively small diameter on the high-pressure side facing the high-pressure chamber 71, and a large-diameter portion 77 of comparatively large diameter on the low-pressure side facing the exterior of the case 85. A shoulder portion 78 is formed between the small-diameter portion 76 and the large-diameter portion 77, and a female thread is formed on the inner surface of the small-diameter portion 76. An annular groove 79 is disposed in the shoulder portion 78 to accommodate an O-ring 88.

The sealing device 87 is a plug member inserted into the described gas charge inlet 84 and has a large-diameter portion 81, which is inserted into the large-diameter portion 77 of the gas charge inlet 84, and a small-diameter portion 80, which has a thread around its outside surface which engages the female thread of the small-diameter portion 76, and the large-diameter portion 81 inserted into the gas charge inlet 84 presses on the O-ring 88 and seals the gas charge inlet 84.

The perimeter portion of the diaphragm 86 is sealed and supported on the outer perimeter portion of the case 85 by a weld portion 82 made by an electron beam or the like, but in addition a saucer-shaped plate 89 is disposed on the diaphragm 86 as a stopper to define the limit of deformation of the diaphragm 86, and the plate 89 is also fastened around its circumference by the weld portion 82. A recess portion 83 shaped like one side of a convex lens is formed on the inner face of the plate 89, which gradually deepens from the outer perimeter portion of the diaphragm 86 towards the center, and communicating holes 90 are formed as fuel channels which communicate with the recess portion 83.

The case 85, the metal diaphragm 86, and the plate 89 are all hermetically sealed and bonded to each other around their outer perimeter portions by welding with an electron beam, or the like. The space sealed between the metal diaphragm 86 and the case 85 is charged with a high-pressure gas such as nitrogen.

In the high-pressure fuel pump assembly 200 in FIG. 5, a male thread 91 formed around the outside of the case 85 engages a corresponding female thread formed in the recess portion 40*c*, and the high-pressure accumulator 70 is inserted into the plate 89, sealed by an O-ring 51, and secured to the recess portion 40*c* so as to allow the communicating holes 90 to communicate with the discharge passage 4*b*.

The high-pressure accumulator 70 constructed in this way absorbs surges in the pressure of the fuel discharged by the discharge passage 4*b*. That is, while fuel is being discharged through the discharge passage 4*b*, surges occur in the discharge passage 4*b*, for example, when the high-pressure fuel pump is operating. The volume of the high-pressure chamber 71 varies in response to changes caused by the surges until the pressure of the high-pressure gas in the high-pressure chamber 71 reaches equilibrium with the pressure in the discharge passage 4*b* through the diaphragm 86. For example, when the pressure in the discharge passage 4*b* rises, the diaphragm 86 is deformed such that the volume of the high-pressure chamber 71 decreases and the volume of the discharge passage 4*b* increases, and so the pressure in the discharge passage 4*b* decreases and surging is reduced.

When an engine stops, the supply of fuel from the high-pressure fuel pump 3 also stops, and the fuel pressure in the lens-shaped recess 83 on the plate 89 side gently decreases. For that reason, the diaphragm 86 is displaced from its position during normal operation shown in the diagram due to the pressure of the gas in the high-pressure chamber 71, but to prevent damage and wear on the diaphragm 86, a diaphragm stopper construction is employed having a curve such that when the diaphragm deforms a certain amount, it comes into contact with the surface of curve of the lens-shaped recess 83 on the plate 89 and does not deform any further, and thus excessive stress does not concentrate on the diaphragm 86.

In a conventional high-pressure accumulator, the plate which the diaphragm comes into contact with is a diaphragm stopper construction which defines the limit of deformation of the diaphragm in order to prevent damage to the diaphragm caused by a large displacement of the diaphragm due to gas pressure in the high-pressure chamber when the engine stops, and its shape has previously been determined on the basis of the deflection of the diaphragm calculated using equations for the deflection of a disk which are well known in material mechanics. The shape of the contact surface used to be defined, for example, based on the equation expressing deflection when a disk secured around its circumference is subjected to a uniformly distributed load or the equation expressing large deflection when a disk secured around its circumference is subjected to a uniformly distributed load, as described in the JSME Handbook for Mechanical Engineer's: Material Mechanics, Sixth Edition (compiled by the Japan Society of Mechanical Engineers).

However, it has been discovered that if the shape used for the contact surface is based on deflection derived from the equation expressing deflection when a disk secured around its circumference is subjected to a uniformly distributed load, stress in the central portion of the diaphragm is high, and even though there may be a strong margin for stress in other portions, the diaphragm may be damaged or ruptured starting at the central portion where stress is locally intense. On the other hand, it has been discovered that if the shape used for the contact surface is based on deflection derived from the equation expressing large deflection when a disk secured around its circumference is subjected to a uniformly distributed load, stress around the perimeter portion of the diaphragm is high, and even though there may be a strong margin for stress in other portions, the diaphragm may be damaged or ruptured starting at the perimeter portion where stress is locally intense.

Also, when used in an environment with a large range of working temperatures, the pressure of the high-pressure gas in the high-pressure chamber 71 changes with changes in working temperature and the operating position of the diaphragm 86 changes. The range of possible changes in volume of the diaphragm 86 is determined by the saucer-shaped recess 74 and the lens-shaped recess 83, so that when the change in the pressure of the high-pressure gas in the high-pressure chamber 71 is great there is a possibility that the diaphragm 86 may come into contact with either the saucer-shaped recess 74 or the lens-shaped recess 83 and fail to function as an accumulator. In order to increase the working range of the high-pressure accumulator, it is necessary to increase the volume of the saucer-shaped recess 74 and the lens-shaped recess 83, and this has conventionally been done by increasing the diameter. In that case, however, the external dimensions of the high-pressure accumulator become too large.

SUMMARY OF THE INVENTION

Consequently, an object of the present invention is to provide a diaphragm stopper construction for a high-pressure accumulator capable of preventing excessive concentrations of stress in a diaphragm, and another object is to provide a diaphragm stopper construction for a high-pressure accumulator which enables an increase in the volume of the gas charge in a high-pressure chamber while maintaining external dimensions roughly equal to those of a conventional high-pressure accumulator.

The present invention provides a diaphragm stopper construction for a high-pressure accumulator characterized in that, in a diaphragm stopper construction for a high-pressure accumulator which defines the limit of deformation of a flexible disk-shaped metal diaphragm disposed in a high-pressure vessel which supports and seals the perimeter portion of the diaphragm to form a high-pressure chamber, excessive concentrations of stress in the diaphragm are prevented by means of the curve of the contact surface of the stopper which comes into contact with said diaphragm which comprises: a first curve for the perimeter portion of the diaphragm which is defined by a first equation expressing deflection when a disk secured around its circumference is subjected to a uniformly distributed load; and a second curve for the central portion of the diaphragm which is defined by a second equation expressing large deflection when a disk secured around its circumference is subjected to a uniformly distributed load.

The first equation may be:

$$\omega=(pa^4/64D)\ \{1-(r^2/a^2)\}^2$$

where

ω is the deflection, p is the load per unit area, a is the outer radius,

D is the flexural rigidity of the plate, given by $D=Eh^3/12(1-v^2)$, where E is Young's modulus, v is Poisson's ratio, and h is the thickness of the plate, and r is an arbitrary radius; and the second equation may be:

$$(\omega_{max}/h)+A(\omega_{max}/h)^3=B(p/E)\ (a/h)^4$$

where $\omega_{max}$ is the maximum deflection, h is the thickness of the plate, A is a modulus of deflection=0.471, B is a modulus of deflection=0.171, p is the load per unit area, E is Young's modulus, and a is the outer radius.

The curve of the contact surface of the stopper which comes into contact with the diaphragm may also be provided with a curve which joins the first and second curves smoothly.

In addition, the curve of the contact surface of the stopper which comes into contact with the diaphragm may also be the curve shown in FIG. 1.

DETAILED DESCRIPTION OF THE PREFERRED EMBODIMENTS

Figure 1:
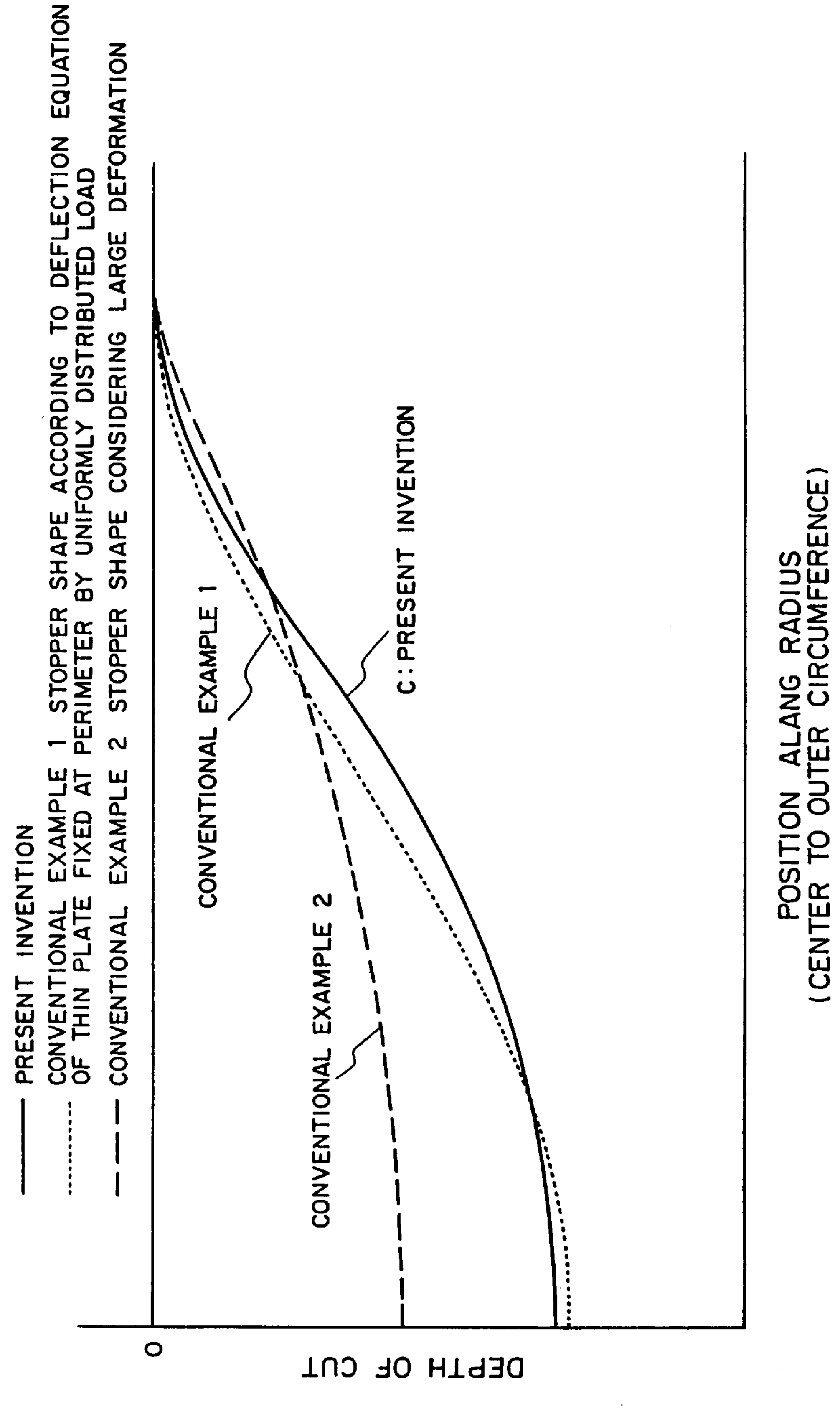
FIG. 1 shows the curves of contact surfaces of stoppers comparing the stopper shape in the diaphragm stopper construction for a high-pressure accumulator according to an embodiment of the present invention with conventional examples.

In FIG. 1, the stopper shape in the diaphragm stopper construction for a high-pressure accumulator according to an embodiment of the present invention (solid line) and the shapes of the stoppers of two conventional examples (dotted line and broken line) are shown by means of the curves of the contact surfaces of the stoppers. Here, the curves represent the cross-sectional shape of the stoppers in the diaphragm stopper constructions, but the curves are also graphs which plot deflection when a disk-shaped metal diaphragm secured around its circumference (diaphragm 86 shown in FIG. 6, for example) is subjected to a uniformly distributed load against position along the radius of the diaphragm.

Figure 2:
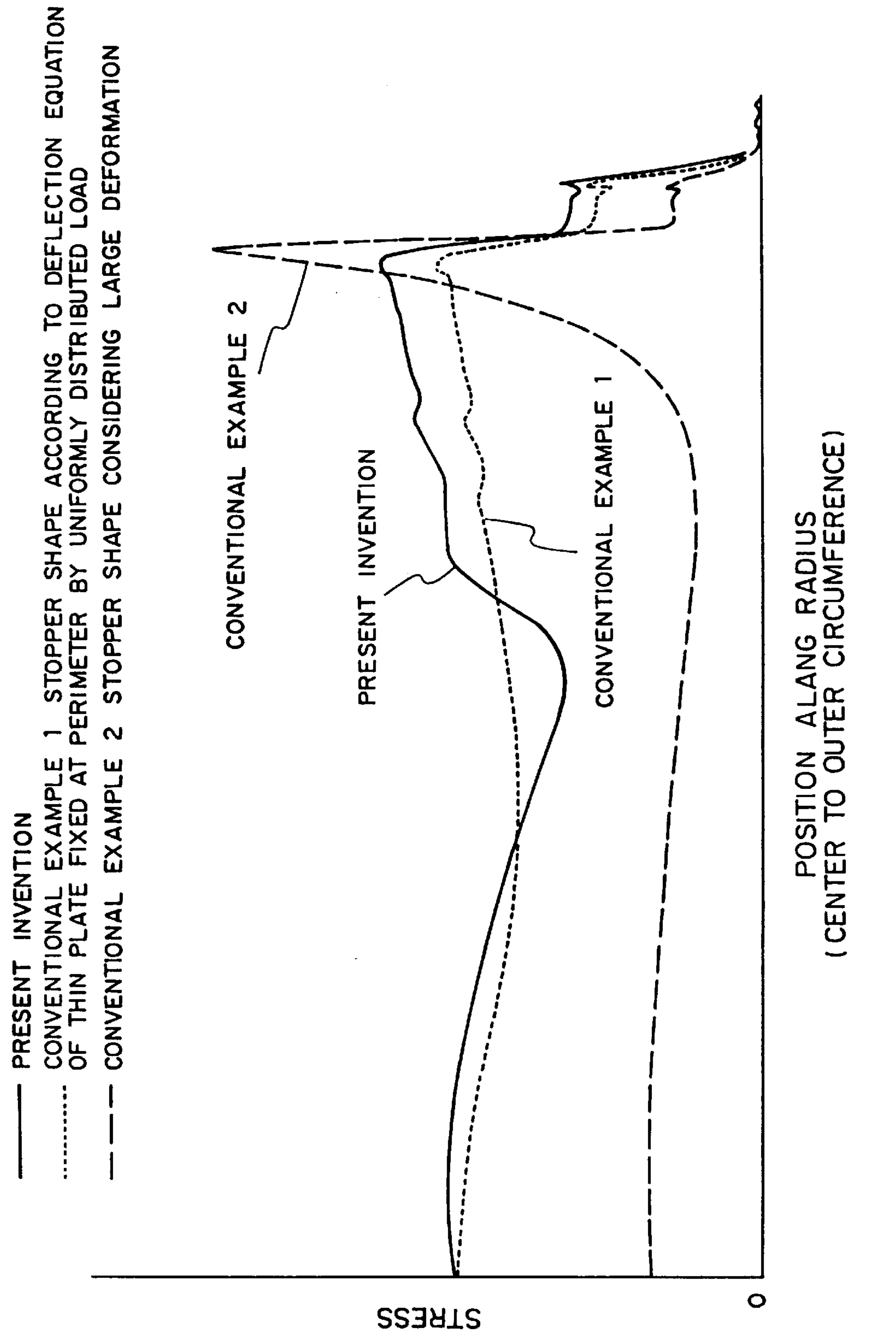
FIG. 2 is a graph of the curves of contact surfaces of stoppers comparing the distribution of stress on the pressurized side of a diaphragm according to the diaphragm stopper construction for a high-pressure accumulator of the present invention with conventional examples.

FIG. 2 is a graph of distribution of stress which plots relative stress occurring at the surface on the pressurized (high-pressure) side of a diaphragm against position along the radius of the diaphragm for the stopper shape according to the present invention and the shapes of the stoppers of the two conventional examples shown in FIG. 1.

Figure 3:
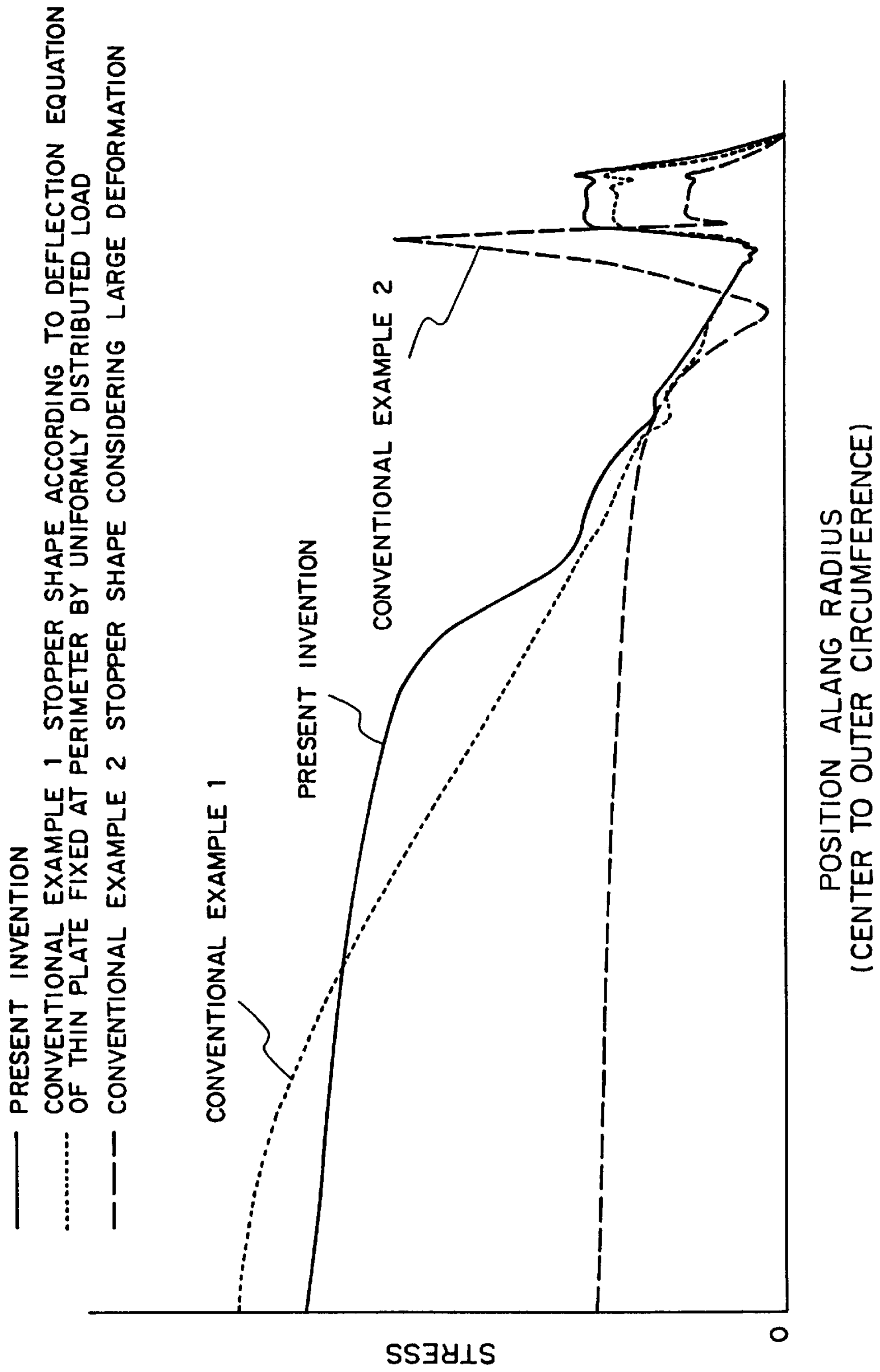
FIG. 3 is a graph of the curves of contact surfaces of stoppers comparing the distribution of stress on the depressurized side of a diaphragm according to the diaphragm stopper construction for a high-pressure accumulator of the present invention with conventional examples.
Figure 4:
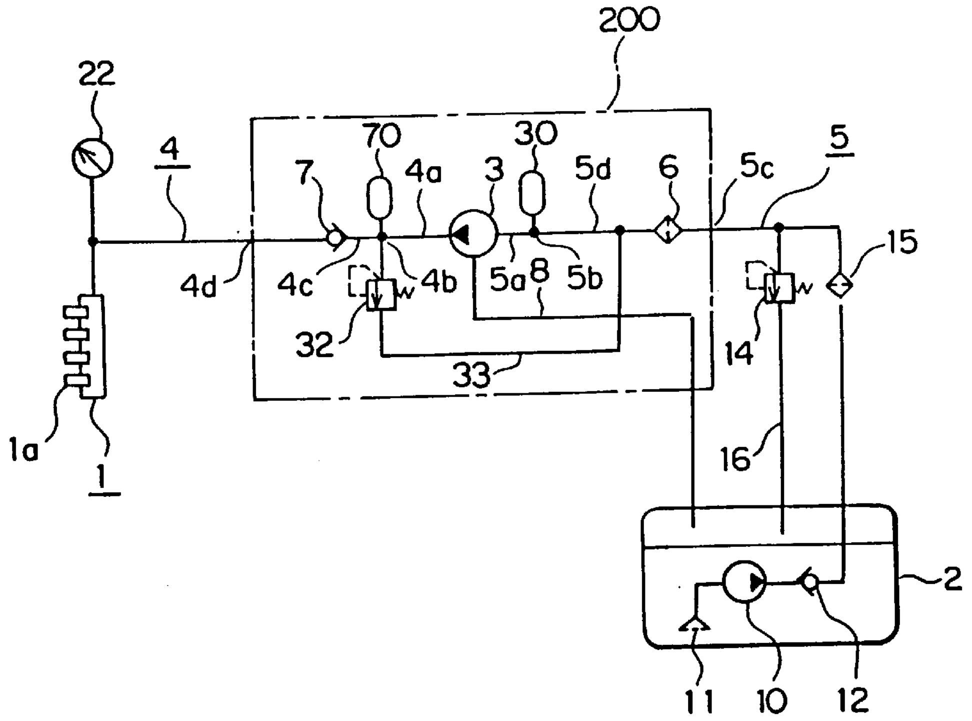
FIG. 4 is a system diagram showing a high-pressure fuel supply system provided with a high-pressure accumulator which is a surge absorption device to which the diaphragm stopper construction of the present invention can be applied.

FIG. 3 is a graph of distribution of stress which plots relative stress occurring at the surface on the depressurized (low-pressure) side of a diaphragm against position along the radius of the diaphragm for the stopper shape according to the present invention and the shapes of the stoppers of the two conventional examples shown in FIG. 1.

In FIG. 1, the curve of Conventional Example 1 is a first curve 86*a* defined by the following first equation expressing deflection when a thin disk secured around its circumference is subjected to a uniformly distributed load:

$$\omega=(pa^4/64D)\ \{1-(r^2/a^2)\}^2 \quad \text{(Equation 1)}$$

where

ω is the deflection, p is the load per unit area, a is the outer radius,

D is the flexural rigidity of the plate, given by $D=Eh^3/12(1-v^2)$, where E is Young's modulus, v is Poisson's ratio, and h is the thickness of the plate, and r is an arbitrary radius.

The stresses which occur in the diaphragm when a curve based on such a first equation (Conventional Example 1) is used as a stopper shape are shown as dotted-line curves (Conventional Example 1) in FIGS. 2 and 3. According to the curve for the high-pressure side of Conventional Example 1 in FIG. 2, stress is relatively small and stable from the central portion of the diaphragm until close to its perimeter portion, then it decreases suddenly at the perimeter portion reaching zero at the perimeter, and there is no problem with the magnitude or concentration of the stress across the entire diaphragm. According to the curve for the low-pressure side of Conventional Example 1 in FIG. 3, stress is extremely high in the central portion of the diaphragm, decreases gradually from there until close to its perimeter portion, increases suddenly in the perimeter portion (although the magnitude is small), then decreases suddenly in the vicinity of the perimeter portion and reaches zero at the perimeter. There is no problem with the magnitude of the stress in the diaphragm in the perimeter portion, but there is a risk of rupture in the central portion because the stress in the central portion is extremely large.

In FIG. 1, the curve of Conventional Example 2 is a second curve 86*b* defined by the following second equation expressing large deflection when a disk secured around its circumference is subjected to a uniformly distributed load:

$$(\omega_{max}/h)+A(\omega_{max}/h)^3=B\ (p/E)\ (a/h)^4 \quad \text{(Equation 2)}$$

where $\omega_{max}$ is the maximum deflection, h is the thickness of the plate, A is a modulus of deflection=0.471, B is a modulus of deflection=0.171, p is the load per unit area, E is Young's modulus, and a is the outer radius.

The stresses which occur in the diaphragm when a curve based on such a second equation (Conventional Example 2) is used as a stopper shape are shown as broken-line curves (Conventional Example 2) in FIGS. 2 and 3. According to the curve for the high-pressure side of Conventional Example 2 in FIG. 2, stress is quite small and stable from the central portion of the diaphragm until close to its perimeter portion, increases suddenly at the perimeter portion and becomes extremely large, then decreases gradually from there and reaches zero at the perimeter, and so there is a risk that the diaphragm will rupture in the perimeter portion because of the magnitude and concentration of stress in its perimeter portion. According to the curve for the low-pressure side of Conventional Example 2 in FIG. 3, stress is relatively low in the central portion of the diaphragm, increases suddenly in the perimeter portion and becomes quite large, then decreases from there and reaches zero at the perimeter. There is a risk that the diaphragm will rupture in its perimeter portion because stress in the diaphragm is largely concentrated in its perimeter portion.

Figure 6:
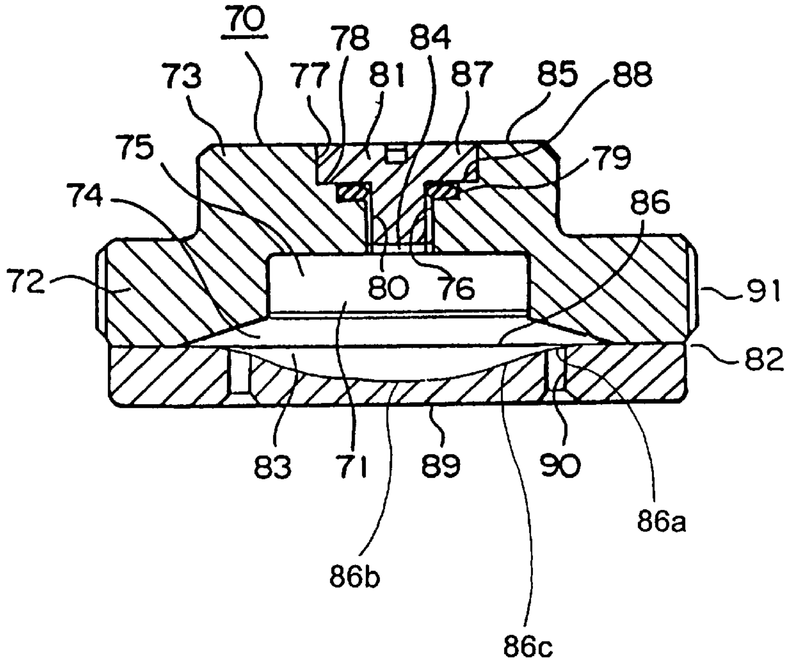
FIG. 6 is a cross-section showing details of a high-pressure accumulator to which the diaphragm stopper construction of the present invention can be applied.
Figure 5:
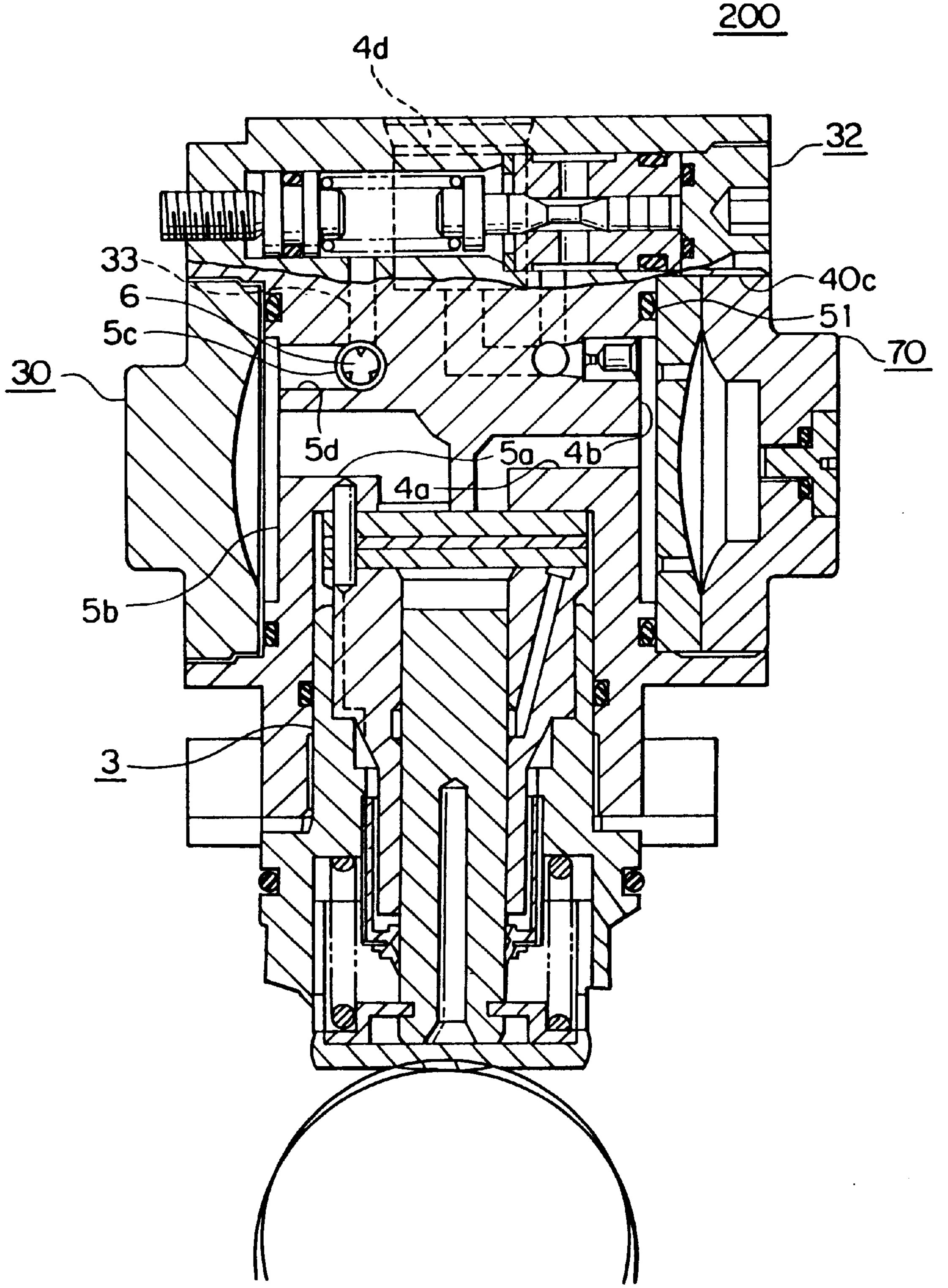
FIG. 5 is a cross-section of the high-pressure fuel pump assembly in FIG. 4.

The diaphragm stopper construction for a high-pressure accumulator according to the present invention is the same as that in the high-pressure accumulator 70 shown in FIGS. 5 and 6 in that it defines the limit of deformation of a flexible disk-shaped metal diaphragm disposed in a high-pressure vessel which supports and seals the perimeter portion of the diaphragm to form a high-pressure chamber, but the curve, which is the shape of the contact surface of the stopper, is different. Consequently, the explanation which follows will use the high-pressure accumulator shown in FIG. 6 as an example of an application of the present invention.

As shown in FIG. 1, in the diaphragm stopper construction for the high-pressure accumulator 70 according to the present invention, excessive concentrations of stress in the diaphragm 86 are prevented and any stress which does occur is not large because the curve of the contact surface of the stopper 89 which comes into contact with the diaphragm 86 comprises: a first curve 86*a* for the perimeter portion of the diaphragm 86, which is determined on the basis of an equation expressing deflection when a disk secured around its circumference is subjected to a uniformly distributed load; and a second curve 86*b* for the central portion of the diaphragm 86, which is determined on the basis of an equation expressing large deflection when a disk secured around its circumference is subjected to a uniformly distributed load.

The above-mentioned first curve may be defined, for example, by the above-mentioned Equation 1; and the second curve may be defined, for example, by the above-mentioned Equation 2.

The first and second curves 86*a*, 86*b* are joined smoothly by a third curve 86*c* in order to make the curve of the contact surface of the stopper 89 which comes into contact with the diaphragm 86 smooth. Such a third curve 86*c* can easily be obtained by computer analysis.

The stresses which occur in the diaphragm 86 when a curve such as that shown in FIG. 1 (Present Invention) is used as a stopper shape are shown as solid-line curves (Present Invention) in FIGS. 2 and 3. According to the curve for the high-pressure side of the Present Invention in FIG. 2, stress is relatively small and stable from the central portion of the diaphragm 86 until close to its perimeter portion and no great stress occurs in its perimeter portion either, and stress decreases suddenly in the vicinity of its perimeter portion reaching zero at the perimeter, and so there is no problem with the magnitude or concentration of the stress across the entire diaphragm 86. According to the curve for the low-pressure side of the Present Invention in FIG. 3, stress is relatively high in the central portion of the diaphragm 86, but decreases gradually from there until close to its perimeter portion, increases slightly in the perimeter portion (but the magnitude is small), then decreases suddenly in the vicinity of the perimeter portion and reaches zero at the perimeter. The stress in the perimeter portion of the diaphragm 86 is sufficiently small, and there is not enough stress to cause problems in the central portion either, and so there is no risk that the diaphragm 86 will rupture.

As is clear from the above explanation, in the diaphragm stopper construction for a high-pressure accumulator according to the present invention, excessive concentrations of stress in the diaphragm are prevented by means of the curve of the contact surface of the stopper which comes into contact with the diaphragm which comprises: a first curve 86*a* for the perimeter portion of the diaphragm which is defined by a first equation expressing deflection when a disk secured around its circumference is subjected to a uniformly distributed load; and a second curve 86*b* for the central portion of the diaphragm which is defined by a second equation expressing large deflection when a disk secured around its circumference is subjected to a uniformly distributed load.

Also, by employing Equations 1 and 2 as the first and second equations, the stopper construction can be designed and manufactured relatively easily.

Also, by employing a curve 86*c* which joins the first and second curves smoothly, the shape of the contact surfaces of the diaphragm stopper construction become even more like the actual deflection and deformation of the diaphragm, and so concentrations of stress in the diaphragm are reduced further.

Consequently, by providing a diaphragm with reduced concentrations of stress, the displacement of the diaphragm can be maximized and so the high-pressure accumulator can fully achieve its surge absorption capabilities in a wide range of working temperatures. Also, the volume of the gas charge in the high-pressure chamber can be increased without increasing the outer diameter of the diaphragm, and the high-pressure accumulator can be made more compact.

What is claimed is:

1. A diaphragm stopper construction, for a high-pressure accumulator, which defines the limit of deformation of a flexible disk-shaped metal diaphragm disposed in a high-pressure vessel which supports and seals the perimeter portion of said diaphragm to form a high-pressure chamber, wherein excessive concentrations of stress in said diaphragm are prevented by means of a curve of a contact surface of said stopper which comes into contact with said diaphragm which comprises:

a first curve for the perimeter portion of said diaphragm which is determined on the basis of a first equation expressing deflection when a disk secured around its circumference is subjected to a uniformly distributed load; and a second curve for the central portion of said diaphragm which is determined on the basis of a second equation expressing large deflection when a disk secured around its circumference is subjected to a uniformly distributed load.

2. The diaphragm stopper construction for a high-pressure accumulator according to claim 1 characterized in that:

said first equation is:

$$\omega=(pa^4/64D)\{1-(r^2/a^2)\}^2$$

where $\omega$ is the deflection, p is the load per unit area, a is the outer radius, D is the flexural rigidity of the plate, given by $D=Eh^3/12(1-v^2)$, where E is Young's modulus, v is Poisson's ratio, and h is the thickness of the plate, and r is an arbitrary radius; and said second equation is:

$$(\omega_{max}/h)+A(\omega_{max}/h)^3=B(p/E)(a/h)^4$$

where $\omega_{max}$ is the maximum deflection, h is the thickness of the plate, A is a modulus of deflection=0.471, B is a modulus of deflection=0.171, p is the load per unit area, E is Young's modulus, and a is the outer radius.

3. The diaphragm stopper construction for a high-pressure accumulator according to claim 1 characterized in that the contact surface of said stopper which comes into contact with said diaphragm is provided with a curve which joins said first and second curves smoothly.

4. The diaphragm stopper construction for a high-pressure accumulator according to claim 1 wherein the curve of the contact surface of said stopper which comes into contact with said diaphragm has a cross-sectional shape wherein a depth of a cut which forms the curve on the contact surface is greater at a center portion of the contact surface than at an outer portion of the contact surface.

* * * * *